(12) United States Patent
Kizhakke Pullarappillil et al.

(10) Patent No.: US 11,979,517 B2
(45) Date of Patent: May 7, 2024

(54) METHODS AND NODES FOR MAINTAINING A COMMUNICATION SESSION FOR A SUBSCRIBER

(71) Applicant: Telefonaktiebolaget LM Ericsson (publ), Stockholm (SE)

(72) Inventors: JayaKrishnan Kizhakke Pullarappillil, Cochin (IN); Ann Soniya Johny, Chennai (IN); Srinivasa Babu Medanki, Guntur (IN); Sowmyanarayanan Narasimhan, Chennai (IN); Sujitha Navaneethakrishnan, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 17/415,633

(22) PCT Filed: Dec. 18, 2018

(86) PCT No.: PCT/IN2018/050850
§ 371 (c)(1),
(2) Date: Jun. 17, 2021

(87) PCT Pub. No.: WO2020/129071
PCT Pub. Date: Jun. 25, 2020

(65) Prior Publication Data
US 2022/0070303 A1    Mar. 3, 2022

(51) Int. Cl.
*H04M 15/00* (2006.01)
*H04L 12/14* (2006.01)
*H04W 4/24* (2018.01)

(52) U.S. Cl.
CPC ....... *H04M 15/8228* (2013.01); *H04M 15/64* (2013.01); *H04M 15/785* (2013.01); *H04M 15/83* (2013.01); *H04W 4/24* (2013.01)

(58) Field of Classification Search
CPC ............ H04M 15/8228; H04M 15/64; H04M 15/785; H04M 15/83; H04M 15/74;
(Continued)

(56) References Cited

U.S. PATENT DOCUMENTS

| 9,204,280 B2 | 12/2015 | Löwenadler et al. |
| 9,762,504 B1 | 9/2017 | Foottit et al. |
| 2018/0359655 A1 | 12/2018 | Zevallos |

FOREIGN PATENT DOCUMENTS

| EP | 3089437 A1 * | 11/2016 | ......... H04L 12/1403 |
| EP | 3089437 A1 | 11/2016 | |

OTHER PUBLICATIONS

International Search Report and Written Opinion of the International Searching Authority, PCT/IN2018/050850, dated Mar. 8, 2019, 8 pages.

(Continued)

*Primary Examiner* — Tanmay K Shah
(74) *Attorney, Agent, or Firm* — Sage Patent Group

(57) ABSTRACT

There is provided mechanisms for granting network resources for maintaining a communication session for a subscriber in a network. A method is performed by a CTF node. The method includes obtaining, from a gateway in the network, a request for network resources for maintaining the communication session for the subscriber, and requesting, from an OCF node and in response thereto, credit units corresponding to the network resources. The method includes obtaining a grant of the credit units as well as an advance credit indication of additional credit units for the communication session from the OCF node. The method further includes storing the advance credit indication for the communication session and providing, to the gateway, a grant for the network resources for maintaining the communication session in accordance with the obtained grant.

13 Claims, 8 Drawing Sheets

(58) Field of Classification Search
CPC .. H04M 15/852; H04M 17/206; H04M 15/70;
H04M 15/853; H04M 15/88; H04M
17/02; H04M 2017/24; H04M 15/8353;
H04M 15/854; H04M 17/204; H04W
4/24; G06Q 20/145; G06Q 20/16; G06Q
20/28; G06Q 20/325; H04L 12/141;
H04L 12/14
USPC ........................................................ 455/406
See application file for complete search history.

(56) References Cited

OTHER PUBLICATIONS

Extended European Search Report dated Nov. 5, 2021 for European Patent Application No. 18944051.4, 14 pages.

* cited by examiner

METHODS AND NODES FOR MAINTAINING A COMMUNICATION SESSION FOR A SUBSCRIBER

CROSS REFERENCE TO RELATED APPLICATIONS

This application is a 35 U.S.C. § 371 national stage application of PCT International Application No. PCT/IN2018/050850 filed on Dec. 18, 2018, the disclosure and content of which is incorporated by reference herein in its entirety.

TECHNICAL FIELD

Embodiments presented herein relate to a method, a Charging Trigger Function (CTF) node, a computer program, and a computer program product for granting network resources for maintaining a communication session for a subscriber in a network. Embodiments presented herein further relate to a method, an Online Charging Function (OCF) node, a computer program, and a computer program product for granting credit units for maintaining the communication session for the subscriber in the network.

BACKGROUND

In communications networks, there may be a challenge to obtain good performance and capacity for a given communications protocol, its parameters and the physical environment in which the communications network is deployed.

For example, online charging is a process where charging information of a subscriber for network resource usage for a communication session in the network of a subscriber is collected concurrently with that network resource usage. Authorization for the network resource usage should be obtained by the network prior to the actual network resource usage to occur. This authorization is granted by an OCF node residing in the Online Charging System (OCS) upon request from a CTF node residing in a core network of the network.

The OCS thereby allows a telecommunication service provider to charge subscribers in real-time, based on network resource usage. The OCS can be configured for both event based charging and session based charging for various services, such as like voice, data, etc. in the network.

The CTF node generates charging events based on information from a gateway in the core network pertaining to observation of network resource usage. The charging events are forwarded to the OCF node in order for the CTF node to obtain authorization for the network resource usage requested by the subscriber.

The CTF node should be configured to delay the actual network resource usage until permission by the OCF node has been granted. Based on the service, the OCF node will rate and reserve required units (monetary or non-monetary) from the user account of the subscriber, and allow the service to be accessed by the subscriber. The reserved units are informed to the CTF node as granted units. The CTF node will request the OCF node for further reservation and granting of network resources during of the communication session. This might occur either when granted units are consumed or when any other rating parameters are changed. The CTF node should be configured to enforce termination of the subscriber's network resource usage when permission from the OCF node is not granted or expires.

The units are thus granted during each request in the communication session and the CTF node should report back the usage and obtain grant for additional units from the OCF node in order for the communication session to be continued by sending a new request to the OCF node. However, it could be that there is a communication failure between the CTF node and the OCF node, resulting in that the communication session for the subscriber cannot be rated. In this scenario, the CTF node might decide either to allow the communication session to continue toll free (i.e. without real-time charging), or to allow the communication session to continue and later post process the Charging Data Records (CDRs) in the OCS, or to terminate the communication session. All these options have drawbacks. If the session is allowed to continue toll free or with later post processing of CDRs, this can lead to revenue loss for the mobile network operator of the subscriber. Terminating the communication session will lead to negative user experience for the subscriber.

Hence, there is still a need for an improved way of handling requests for network resources for maintaining a communication session for a subscriber.

SUMMARY

An object of embodiments herein is to alleviate, or at least reduce or mitigate the above disclosed issues.

According to a first aspect there is presented a method for granting network resources for maintaining a communication session for a subscriber in a network. The method is performed by a CTF node. The method comprises obtaining, from a gateway in the network, a request for network resources for maintaining the communication session for the subscriber. The method comprises requesting, from an OCF node and in response thereto, credit units corresponding to the network resources. The method comprises obtaining a grant of the credit units as well as an advance credit indication of additional credit units for the communication session from the OCF node. The method comprises storing the advance credit indication for the communication session. The method comprises providing, to the gateway, a grant for the network resources for maintaining the communication session in accordance with the obtained grant.

According to a second aspect there is presented a CTF node for granting network resources for maintaining a communication session for a subscriber in a network. The CTF node comprises processing circuitry. The processing circuitry is configured to cause the CTF node to obtain, from a gateway in the network, a request for network resources for maintaining the communication session for the subscriber. The processing circuitry is configured to cause the CTF node to request, from an OCF node and in response thereto, credit units corresponding to the network resources. The processing circuitry is configured to cause the CTF node to obtain a grant of the credit units as well as an advance credit indication of additional credit units for the communication session from the OCF node. The processing circuitry is configured to cause the CTF node to store the advance credit indication for the communication session. The processing circuitry is configured to cause the CTF node to provide, to the gateway, a grant for the network resources for maintaining the communication session in accordance with the obtained grant.

According to a third aspect there is presented a CTF node for granting network resources for maintaining a communication session for a subscriber in a network. The CTF node comprises an obtain module configured to obtain, from a gateway in the network, a request for network resources for maintaining the communication session for the subscriber.

The CTF node comprises a request module configured to request, from an OCF node and in response thereto, credit units corresponding to the network resources. The CTF node comprises an obtain module configured to obtain a grant of the credit units as well as an advance credit indication of additional credit units for the communication session from the OCF node. The CTF node comprises a store module configured to store the advance credit indication for the communication session. The CTF node comprises a provide module configured to provide, to the gateway, a grant for the network resources for maintaining the communication session in accordance with the obtained grant.

According to a fourth aspect there is presented a computer program for granting network resources for maintaining a communication session for a subscriber in a network. The computer program comprises computer program code which, when run on processing circuitry of a CTF node, causes the CTF node to perform a method according to the first aspect.

According to a fifth aspect there is presented a method for granting credit units for maintaining a communication session for a subscriber in a network. The method is performed by an OCF node. The method comprises obtaining, from a CTF node, a request for credit units corresponding to network resources for maintaining the communication session for the subscriber. The method comprises providing a grant of the credit units as well as an advance credit indication of additional credit units for the communication session to the CTF node.

According to a sixth aspect there is presented an OCF node for granting credit units for maintaining a communication session for a subscriber in a network. The OCF node comprises processing circuitry. The processing circuitry is configured to cause the OCF node to obtain, from a CTF node, a request for credit units corresponding to network resources for maintaining the communication session for the subscriber. The processing circuitry is configured to cause the OCF node to provide a grant of the credit units as well as an advance credit indication of additional credit units for the communication session to the CTF node.

According to a seventh aspect there is presented an OCF node for granting credit units for maintaining a communication session for a subscriber in a network. The OCF node comprises an obtain module configured to obtain, from a CTF node, a request for credit units corresponding to network resources for maintaining the communication session for the subscriber. The OCF node comprises a provide module configured to provide a grant of the credit units as well as an advance credit indication of additional credit units for the communication session to the CTF node.

According to an eight aspect there is presented a computer program for granting credit units for maintaining a communication session for a subscriber in a network. The computer program comprises computer program code which, when run on processing circuitry of an OCF node, causes the OCF node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these CTF nodes, these OCF nodes, these computer programs, and this computer program product provide efficient handling of requests for network resources for maintaining the communication session for the subscriber.

Advantageously these methods, these CTF nodes, these OCF nodes, these computer programs, and this computer program product reduce the risk of the communication session being interrupted because the OCF node is unavailable.

Advantageously these methods, these CTF nodes, these OCF nodes, these computer programs, and this computer program product avoid the use of unnecessary communication session termination procedures and communication session establishment procedures.

Advantageously these methods, these CTF nodes, these OCF nodes, these computer programs, and this computer program product avoid unnecessary control signalling in the network.

Advantageously these methods, these CTF nodes, these OCF nodes, these computer programs, and this computer program product improve the user experience for the subscriber.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
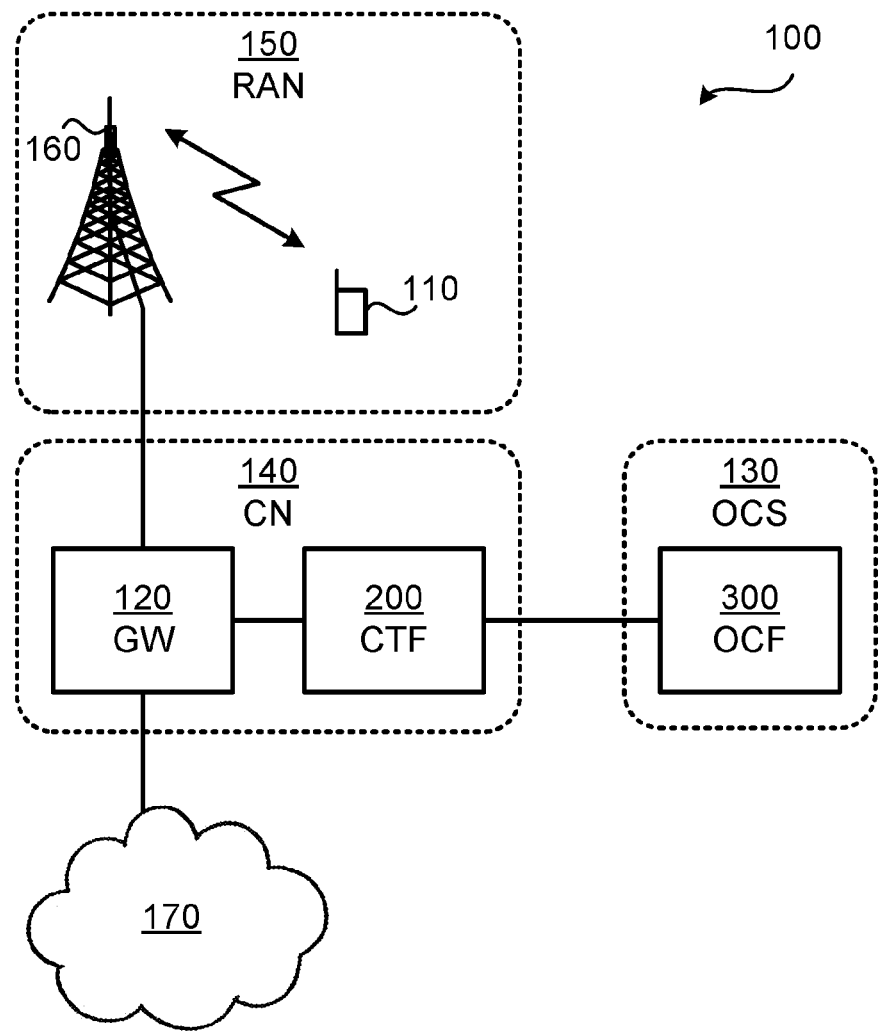
FIG. 1 is a schematic diagram illustrating a network according to embodiments.

FIG. 1 is a schematic diagram illustrating a network 100 where embodiments presented herein can be applied. The network 100 could be a third generation (3G) telecommunication system, a fourth generation (4G) telecommunication system, or a fifth (5G) telecommunication system and support any 3GPP telecommunications standard, where applicable.

The network 100 comprises a radio access network (RAN) 150, a core network (CN) 140, and a packet based service network 170, such as the Internet. The radio access network 150 is operatively connected to the core network 140, which in turn is operatively connected to the packet based service network 170. Subscribers 110, such as wireless devices, are thereby, via a radio base station 160 in the radio access network 150 and at least one gateway (GW) 120 in the core network 140 access services of, and exchange data with, the service network 170 during a communication session of the subscriber 110. As the skilled person understands, the network 100 might comprise further entities, functions, nodes, and devices, such as an offline charging system. The gateway 120 could be any of, or a combination of, a service gateway and a packet data network gateway.

Examples of radio base stations 160 are radio access network nodes, radio base stations, base transceiver stations, Node Bs, evolved Node Bs, g Node Bs, access points, access nodes, transmission and reception points, and backhaul nodes. Examples of subscribers 110 are wireless devices, terminal devices, mobile stations, mobile phones, handsets, wireless local loop phones, user equipment (UE), smartphones, laptop computers, tablet computers, network equipped sensors, network equipped vehicles, and so-called Internet of Things devices.

When the subscriber 110 is to access services of, and exchange data with, the service network 170 during the communication session, the gateway 120, for example, requests network resources from a CTF node 200 located in the core network 140 for maintaining the communication session for the subscriber 110. In turn, the CTF node 200 requests credit units corresponding to the network resources from an OCF node 300 located in an OCS 130. Assuming that credit units are available for the subscriber 110, the OCF node 300 responds with a grant of the credit units. The CTF node 200 then provides, to the gateway 120, a grant for the network resources for maintaining the communication session in accordance with the obtained grant. However, as noted above, it could be that the OCF node 300 is unavailable when the CTF node 200 requests credit units from the OCF node 300. Corresponding resulting disadvantages have been listed above. If possible, such disadvantages should be avoided, or at least reduced or mitigated. There is thus a need for improved handling requests for network resources for maintaining the communication session for the subscriber 110.

The embodiments disclosed herein therefore relate to mechanisms for granting network resources for maintaining a communication session for a subscriber 110 in a network 100 and granting credit units for maintaining a communication session for a subscriber 110 in a network 100. In order to obtain such mechanisms there is provided a CTF node 200, a method performed by the CTF node 200, a computer program product comprising code, for example in the form of a computer program, that when run on processing circuitry of the CTF node 200, causes the CTF node 200 to perform the method. In order to obtain such mechanisms there is further provided an OCF node 300, a method performed by the OCF node 300, and a computer program product comprising code, for example in the form of a computer program, that when run on processing circuitry of the OCF node 300, causes the OCF node 300 to perform the method.

Figure 2:
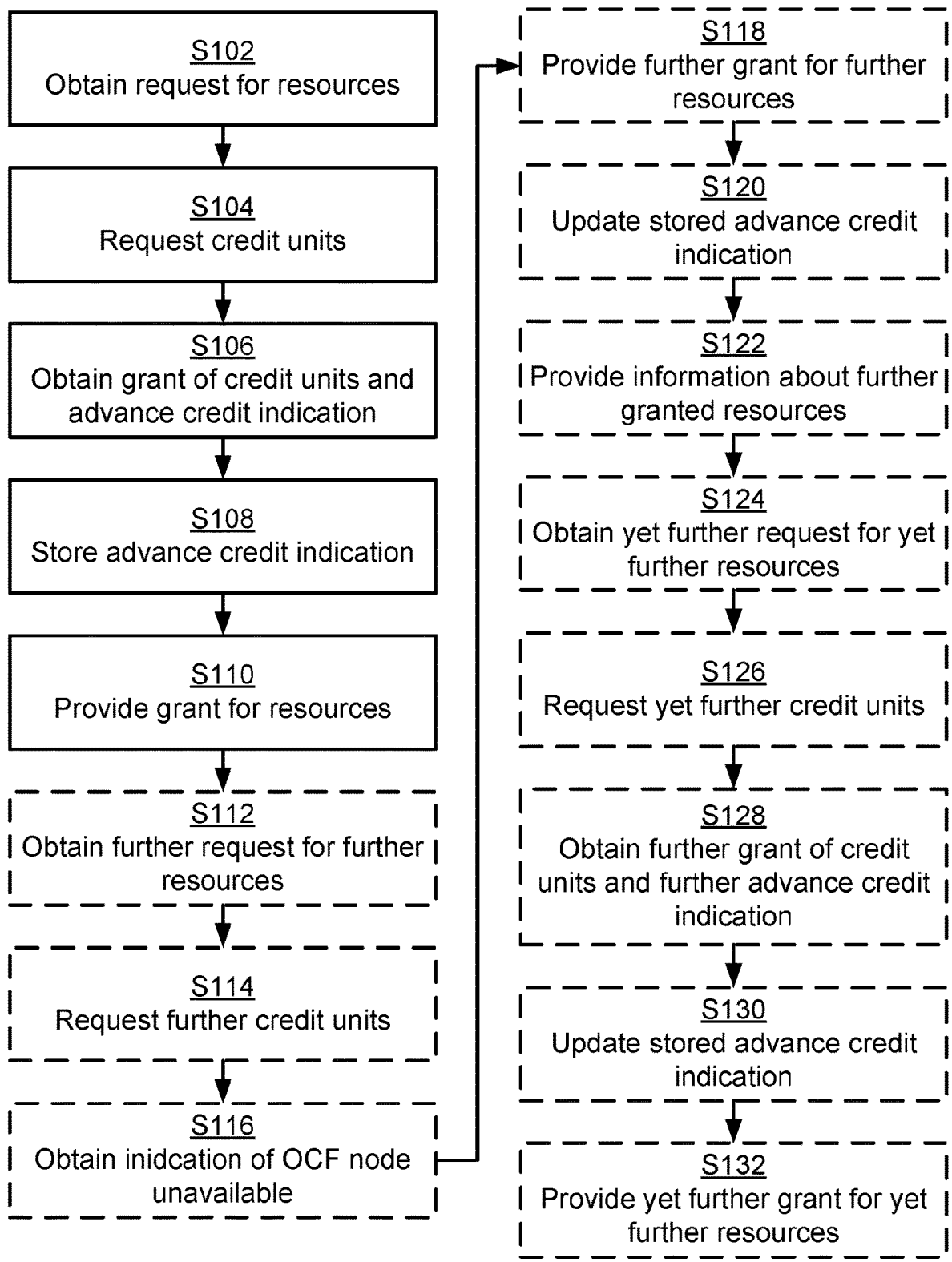
FIGS. 2, 3, 5, and 6 are flowcharts of methods according to embodiments.

Reference is now made to FIG. 2 illustrating a method for granting network resources for maintaining a communication session for a subscriber 110 in a network 100 as performed by the CTF node 200 according to an embodiment.

As disclosed above, the gateway 120 request network resources in order for the communication session for the subscriber is to be maintained. It is assumed that this request is obtained by the CTF node 200. The CTF node 200 is thus configured to perform step S102:

S102: The CTF node 200 obtains, from the gateway 120 in the network 100, a request for network resources for maintaining the communication session for the subscriber 110.

The CTF node 200 then requests the corresponding credit units from the OCF node 300. That is, the CTF node 200 is configured to perform step S104:

S104: The CTF node 200 requests, from the OCF node 300 and in response thereto (i.e., in response to having obtained the request in step S104), credit units corresponding to the network resources.

As will be further disclosed below, the OCF node 300 will inform the CTF node 200 in advance of how many such credit units can be granted to the subscriber for the same session communication session. Thus, the CTF node 200 is configured to perform step S106:

S106: The CTF node 200 obtains a grant of the credit units as well as an advance credit indication of additional credit units for the communication session from the OCF node 300.

The CTF node 200 will, upon receiving the grant and the advance credit indication from the OCF node 300, cache the advance indication (in addition to other values for the communication session). In particular, the CTF node 200 is configured to perform step S108:

S108: The CTF node 200 stores the advance credit indication for the communication session.

SThe CTF node 200 will, upon receiving the grant and the advance credit indication from the OCF node 300, provide a grant to the gateway 120. In particular, the CTF node 200 is configured to perform step S110:

S110: The CTF node 200 provides, to the gateway 120, a grant for the network resources for maintaining the communication session in accordance with the obtained grant.

The advance credit indication can be used when the CTF node 200 is not able to reach the OCF node 300. By using the advance credit indication, the CTF node 200 ensures that the communication session can be maintained as normal even when the OCF node 300 is unreachable.

Embodiments relating to further details of granting network resources for maintaining a communication session for a subscriber 110 in a network 100 as performed by the CTF node 200 will now be disclosed.

There could be different types of network resources. Non-limiting examples include, but are not limited to the amount of resource blocks occupied by data and dedicated control signalling for the subscriber, the amounts of bits needed for communication of data and dedicated control signalling for the subscriber, the amount of memory and/or computing resources needed to be allocated in the communications network for handling communication of data and dedicated control signalling for the subscriber, etc.

There could be different types of advance credit indications. According to an embodiment, the grant of the credit units is valid for one single request for credit units for the communication session, and the advance credit indication pertains to grant of credit units for N≥1 additional such requests for the same communication session. Hence, the CTF node 200 is thereby enabled to respond to N consecutive requests for network resources for the same communication session for the subscriber 110 even if the OCF node 300 is unreachable. In some non-limiting examples, 1≤N≤20. The value of N could depend on the service used by the subscriber 110, the type of subscription the subscriber 110 has, the total amount of quota available for the subscriber 110, etc.

There could be different ways for the CTF node 200 to act once the advance credit indication has expired, such as for examples after the CTF node 200 having responded to N consecutive requests for network resources for the same communication session for the subscriber 110 where the OCF node 300 is unreachable. According to an embodiment, upon expiration of the advance credit indication the CTF node 200 either grants the gateway 120 to maintain the communication session or causes the gateway 120 to terminate the communication session. That is, the CTF node 200 might decide either to allow the communication session to continue toll free (i.e. without real-time charging), or to allow the communication session to continue and later post process the CDRs in the OCS 130, or to terminate the communication session.

As disclosed above, the advance credit indication can be used when the CTF node 200 is not able to reach the OCF node 300. In more detail, when the CTF node 200 detects that the OCF node 300 is unreachable, while trying to obtain more credit units for the communication session, then CTF node 200 will use the stored advance credit indication and grant further network resources for that communication session. Hence, according to an embodiment, the advance credit indication is used for granting further network resources for maintaining the communication session for the subscriber 110 when the OCF node 300 is unavailable. By means of these further network resources the communication session is enabled to continue for the subscriber 110.

According to an embodiment the CTF node 200 is configured to perform (optional) steps S112-S118:

S112: The CTF node 200 obtains, from the gateway 120, a further request for further network resources for maintaining the communication session for the subscriber 110.

S114: The CTF node 200 requests, from the OCF node 300 and in response thereto (i.e., in response to having obtained the further request in step S112), further credit units corresponding to the further network resources.

It is in this embodiment assumed that the the CTF node 200 is not able to reach the OCF node 300, or in other words that the OCF node 300 is unreachable. Hence:

S116: The CTF node 200 obtains an indication of unavailability of the OCF node 300.

There could be different ways for the CTF node 200 to determine that the OCF node 300 is unavailable, and thus to obtain the indication of unavailability of the OCF node 300. For example, the CTF node 200 might use a time-out mechanism. As an example, a timer might be started when the request is provided to the OCF node 300 and if the CTF node 200 does not receive any acknowledgement from the OCF node 300 of the request once the timer has expired the CTF node 200 deems the OCF node 300 to be unavailable. As the skilled person understands there could be other mechanisms for the CTF node 200 to determine that the OCF node 300 is unavailable and thus to obtain the indication of unavailability of the OCF node 300.

The CTF node 200 then determines whether to deny or grant further network resources based on the stored advance credit indication (for the same communication session for the subscriber 110). Hence:

S118: The CTF node 200 provides, to the gateway 120, a further grant of the further network resources for maintaining the communication session in accordance with the stored advance credit indication.

In some aspects the stored advance credit indication is updated when consumed by the further grant of the further network resources. In particular, according to an embodiment the CTF node 200 is configured to perform (optional) step S120:

S120: The CTF node 200 updates the stored advance credit indication for the communication session in accordance with the further network resource having been granted.

In some aspects the CTF node 200 informs the OCF node 300 about the thus updated advance credit indication. Thus, according to an embodiment the CTF node 200 is configured to perform (optional) step S122 when the OCF node 300 no longer is unavailable (i.e., when the OCF node 300 becomes available):

S122: The CTF node 200 provides information about the further granted network resources to the OCF node 300.

There could be different ways for the CTF node 200 to inform the OCF node 300 about the thus updated advance credit indication.

In some aspects the CTF node 200 determines based on a configuration parameter, whether to initiate the account update separately or as part of a next update request for the communication session. Thus, according to an embodiment, the information is provided either upon requesting yet further credit units for the communication session, or separately from requesting yet further credit units for the communication session.

In some aspects the stored advance credit indication is updated when the CTF node 200 receives a new advance credit indication from the OCF node 300. In particular, according to an embodiment, the advance credit indication is updated upon obtaining yet further advance credit indication of yet additional credit units for the communication session from the OCF node 300.

In more detail, when requesting yet further credit units for the communication session, if the OCF node 300 is reachable, the CTF node 200 will ignore the previously stored advance credit indication and will attempt to obtain further credit units from the OCF node 300. The CTF node 200 will then store this updated advance credit indication (thus overwriting the previously stored advance credit indication). Thus, according to an embodiment the CTF node 200 is configured to perform (optional) steps S124-S132:

S124: The CTF node 200 obtains, from the gateway 120, a yet further request for yet further network resources for maintaining the communication session for the subscriber 110.

S126: The CTF node 200 requests, from the OCF node 300 and in response thereto (i.e., in response to having obtained the yet further request in step S124), yet further credit units corresponding to the yet further network resources.

S128: The CTF node 200 obtains a further grant of the yet further credit units as well as a further advance credit indication of yet additional credit units for the communication session from the OCF node 300.

The stored advance credit indication is then updated based on the further advance credit indication. Thus:

S130: The CTF node 200 updates the stored advance credit indication for the subscriber communication session based on the further advance credit indication.

S132: The CTF node 200 provides, to the gateway 120, a yet further grant of the yet further network resources for maintaining the communication session in accordance with the yet further grant.

Figure 3:
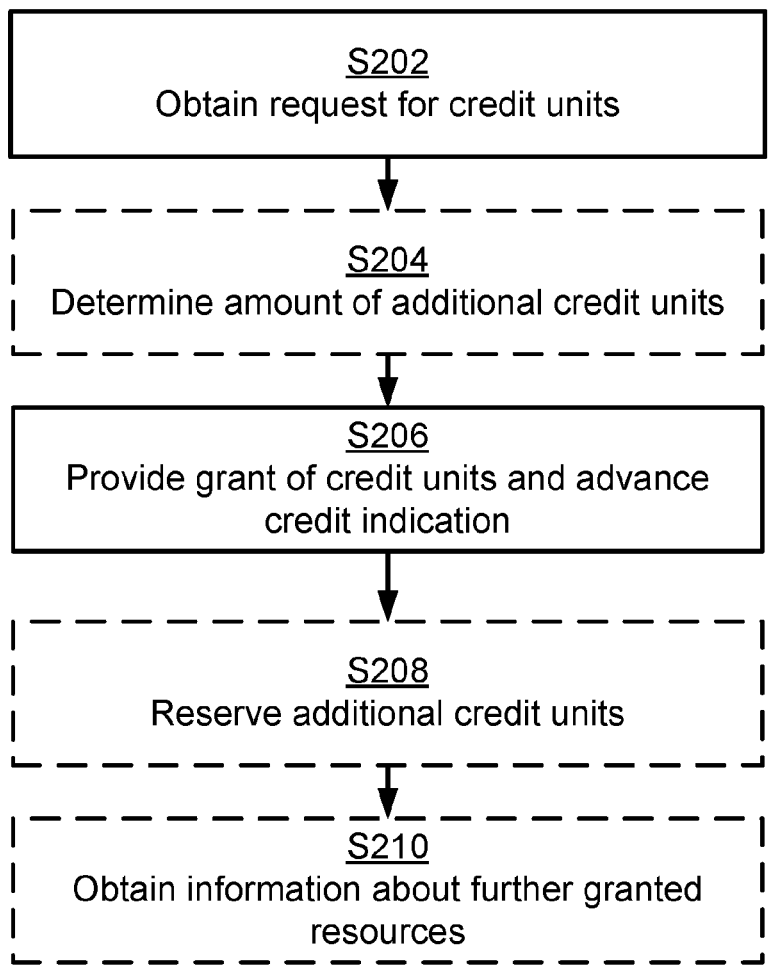

Reference is now made to FIG. 3 illustrating a method for granting credit units for maintaining a communication session for a subscriber 110 in a network 100 as performed by the OCF node 300 according to an embodiment.

As disclosed above, the CTF node 200 requests credit units from the OCF node 300 for maintaining the communication session for the subscriber 110. It is assumed that the OCF node 300 obtains this request. The OCF node 300 is thus configured to perform step S202:

S202: The OCF node 300 obtains, from the CTF node 200, a request for credit units corresponding to network resources for maintaining the communication session for the subscriber 110.

Assuming that credit units for the subscriber 110 indeed are available, the OCF node 300 grants service to the communication session via a grant of credits units that is provided to the CTF node 200. The OCF node 300 will then also provide the CTF node 200 with an advance credit indication for the communication session. Hence, the OCF node 300 is thus configured to perform step S206:

S206: The OCF node 300 provides a grant of the credit units as well as an advance credit indication of additional credit units for the communication session to the CTF node 200.

As noted above, the advance credit indication can be stored by the CTF node 200 and used when the CTF node 200 is not able to reach the OCF node 300. By using the advance credit indication stored in CTF node 200, the CTF node 200 ensures that the communication session can be maintained as normal even when the OCF node 300 is unreachable.

Embodiments relating to further details of granting credit units for maintaining a communication session for a subscriber 110 in a network 100 as performed by the OCF node 300 will now be disclosed.

As disclosed above, according to an embodiment, the grant of the credit units is valid for one single request for credit units for the communication session, and the advance credit indication pertains to grant of credit units for $N \geq 1$ additional such requests.

In some aspects the OCF node 300 determines the amount of credit units to be represented by the advance credit indication. According to an embodiment the OCF node 300 is configured to perform (optional) step S204:

S204: The OCF node 300 determines the amount of additional credit units to be indicated to the CTF node 200.

In this respect, the OCF node 300, or the OCS 130, might determine the advance credit indication based on a configurable set of parameters (such as the remaining balance for the subscriber 110, type of subscription for the subscriber 110, type of service for the communication session, previous usage pattern, etc.). Further in this respect, the OCF node 300, or the OCS 130, might be configured with a maximum threshold value for the advance credit indications (for example such that the advance credit indications cannot exceed x % of the total available quota for the subscriber 110, where $0<x<100$ is a configurable number, such as $10<x<30$).

In some aspects the OCF node 300, or the OCS 130, reserves the additional credit units that corresponds to the advance credit indication. Thus, according to an embodiment the OCF node 300 is configured to perform (optional) step S208:

S208: The OCF node 300 reserves the additional credit units for the communication session upon having provided the grant of the credit units to the CTF node 200.

In this respect, the reserved additional credit units might only be part of the total available credit units for the subscriber 110. As above, the OCF node 300, or the OCS 130, might be configured with a maximum threshold value for the advance credit indications such that only a small portion of the total quota for the subscriber 110 is reserved each time.

As disclosed above, in some aspects the CTF node 200 updates the stored advance credit indication and informs the OCF node 300 about the thus updated advance credit indication. Hence, according to an embodiment the OCF node 300 is configured to perform (optional) step S210:

S210: The OCF node 300 obtains information about further granted network resources for the communication session from the CTF node 200, the further granted network resources having been granted in accordance with the advance credit indication.

As disclosed above there could be different ways for the CTF node 200 to inform the OCF node 300 about the thus updated advance credit indication, and thus different ways for the OCF node 300 to obtain the information in step S210. In view of the above, according to an embodiment, the information in step S210 is obtained either upon the OCF node 300 obtaining a request for yet further credit units for the communication session from the CTF node 200, or separately from the OCF node 300 obtaining a request for yet further credit units for the communication session from the CTF node 200.

Figure 4:
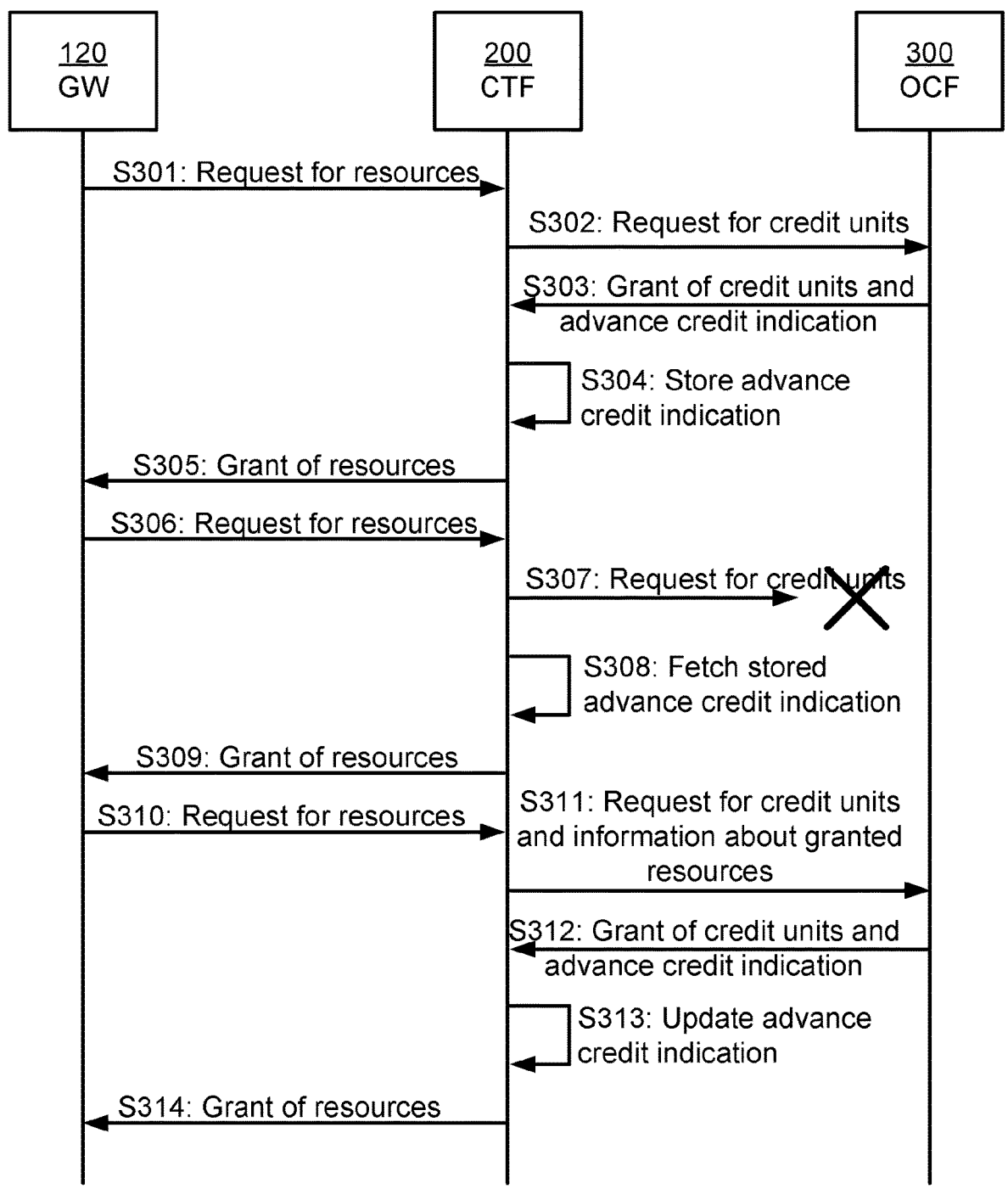
FIG. 4 is a signalling diagram according to embodiments.

One particular embodiment for granting network resources and for granting credit units for maintaining a communication session for a subscriber 110 in a network 100 based on at least some of the above disclosed embodiments will now be disclosed in detail with reference to the signalling diagram of FIG. 4.

S301: The gateway 120 requests network resources for maintaining a communication session for a subscriber 110. The CTF node 200 thus obtains the request for the network resources.

S302: The CTF node 200 requests, from the OCF node and in response to having obtained the request in step S301, credit units corresponding to the network resources. The OCF node 300 thus obtains the request for credit units.

S303: The OCF node 300 provides a grant of the credit units as well as an advance credit indication of additional credit units for the communication session to the CTF node 200. The CTF node 200 thus obtains the grant of the credit units as well as the advance credit indication of additional credit units. The OCF node 300 also reserves the additional credit units for the communication session upon having provided the grant of the credit units to the CTF node 200.

S304: The CTF node 200 stores the advance credit indication for the communication session.

S305: The CTF node 200 provides, to the gateway 120, the grant for the network resources for maintaining the communication session in accordance with the obtained grant.

It is here for illustrative purposes assumed that the subscriber 110 consumes the thus granted network resources and is in need for more network resources in order for the communication session to be maintained.

S306: The gateway 120 requests further network resources for maintaining the communication session for the subscriber 110. The CTF node 200 thus obtains the further request for the further network resources.

S307: The CTF node 200 requests, from the OCF node 300 and in response to having obtained the further request, further credit units corresponding to the further network resources. The CTF node 200 further obtains an indication of unavailability of the OCF node 300.

S308: The CTF node 200 fetches the stored advance credit indication in order to determine whether to deny or grant further for the same communication session for the subscriber 110.

It is here for illustrative purposes assumed that the stored advance credit indication allows the further network resources to the granted.

S309: The CTF node 200 provides, to the gateway 120, a further grant of the further network resources for maintaining the communication session in accordance with the stored advance credit indication.

SIt is here for illustrative purposes assumed that the subscriber 110 consumes the thus granted further network resources and is in need for even more network resources in order for the communication session to be maintained.

S310: The gateway 120 requests yet further network resources for maintaining the communication session for the subscriber 110. The CTF node 200 thus obtains the yet further request for the yet further network resources.

S311: The CTF node 200 requests, from the OCF node 300 and in response to having obtained the yet further request in step S310, yet further credit units corresponding to the yet further network resources. The OCF node 300 thus obtains the yet further request. The CTF node 200 also provides information about the further granted network resources (i.e., information about network resources granted during unavailability of the OCF node 300) to the OCF node 300. The OCF node 300 thus obtains the information.

S312: The OCF node 300 provides a further grant of the yet further credit units as well as a further advance credit indication of yet additional credit units for the subscriber 110 to the CTF node 200. The CTF node 200 thus obtains the further grant and the further advance credit indication.

S313: The CTF node 200 updates the stored advance credit indication for the communication session based on the further advance credit indication.

S314: The CTF node 200 provides, to the gateway 120, a yet further grant of the yet further network resources for maintaining the communication session in accordance with the yet further grant.

Figure 5:
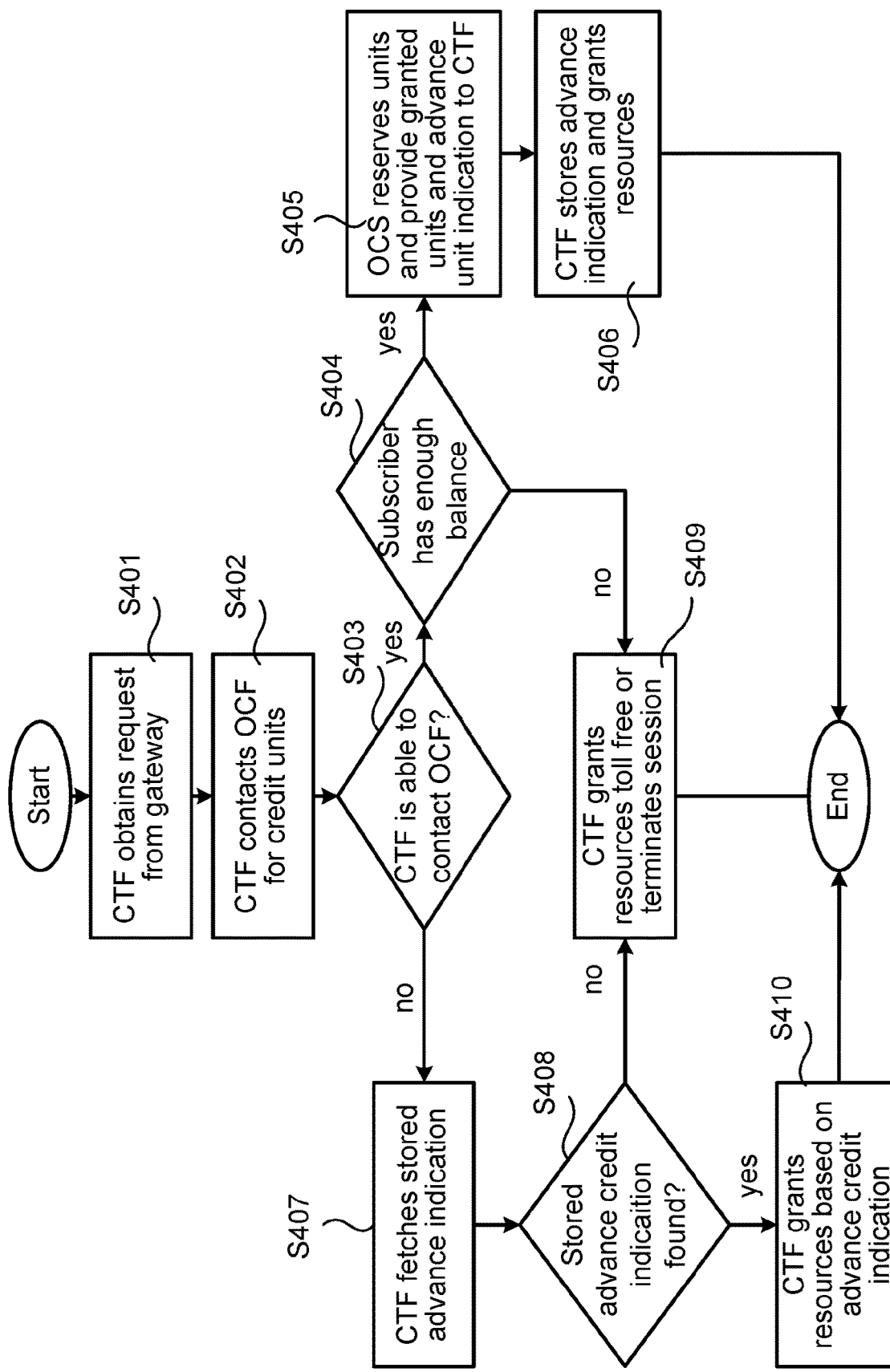

FIG. 5 is a flowchart illustrating an example of a request for network resources is handled by the CTF node 200 and the OCF node 300.

S401: The CTF node 200 obtains, from the gateway 120 in the network 100, a request for network resources for maintaining the communication session for the subscriber 110.

S402: The CTF node 200 requests, from the OCF node 300 and in response to having obtained the request in step S401, credit units corresponding to the network resources.

S403: In case the CTF node 200 is able to contact the OCF node 300 step S404 is entered (i.e., when the OCF node 300 is reachable). In case the CTF node 200 is unable to contact the OCF node 300 step S407 is entered (i.e., when the OCF node 300 is unreachable).

S404: The OCF node 300 checks if there is enough credit balance for the subscriber 110. If yes, step S405 is entered, and if no, step S409 is entered.

S405: The OCF node 300 determines the amount of additional credit units to be indicated to the CTF node 200. The OCF node 300 provides a grant of the credit units as well as an advance credit indication of the additional credit units for the communication session to the CTF node 200. The OCF node 300 reserves the additional credit units for the communication session upon having provided the grant of the credit units to the CTF node 200.

S406: The CTF node 200 stores the advance credit indication for the communication session. The CTF node 200 provides, to the gateway 120, a grant for the network resources for maintaining the communication session in accordance with the obtained grant.

S407: The CTF node 200 fetches stored advance credit indication in order to determine whether to deny or grant further for the same communication session for the subscriber 110.

S408: In case the CTF node 200 is able to find the stored advance credit indication step S410 is entered. In case the CTF node 200 is unable to find the stored advance credit indication step S409 is entered.

S409: The CTF node 200 either grants the gateway 120 to maintain the communication session or causes the gateway 120 to terminate the communication session.

S410: CTF node 200 provides, to the gateway 120, a grant of the network resources for maintaining the communication session in accordance with the stored advance credit indication.

Figure 6:
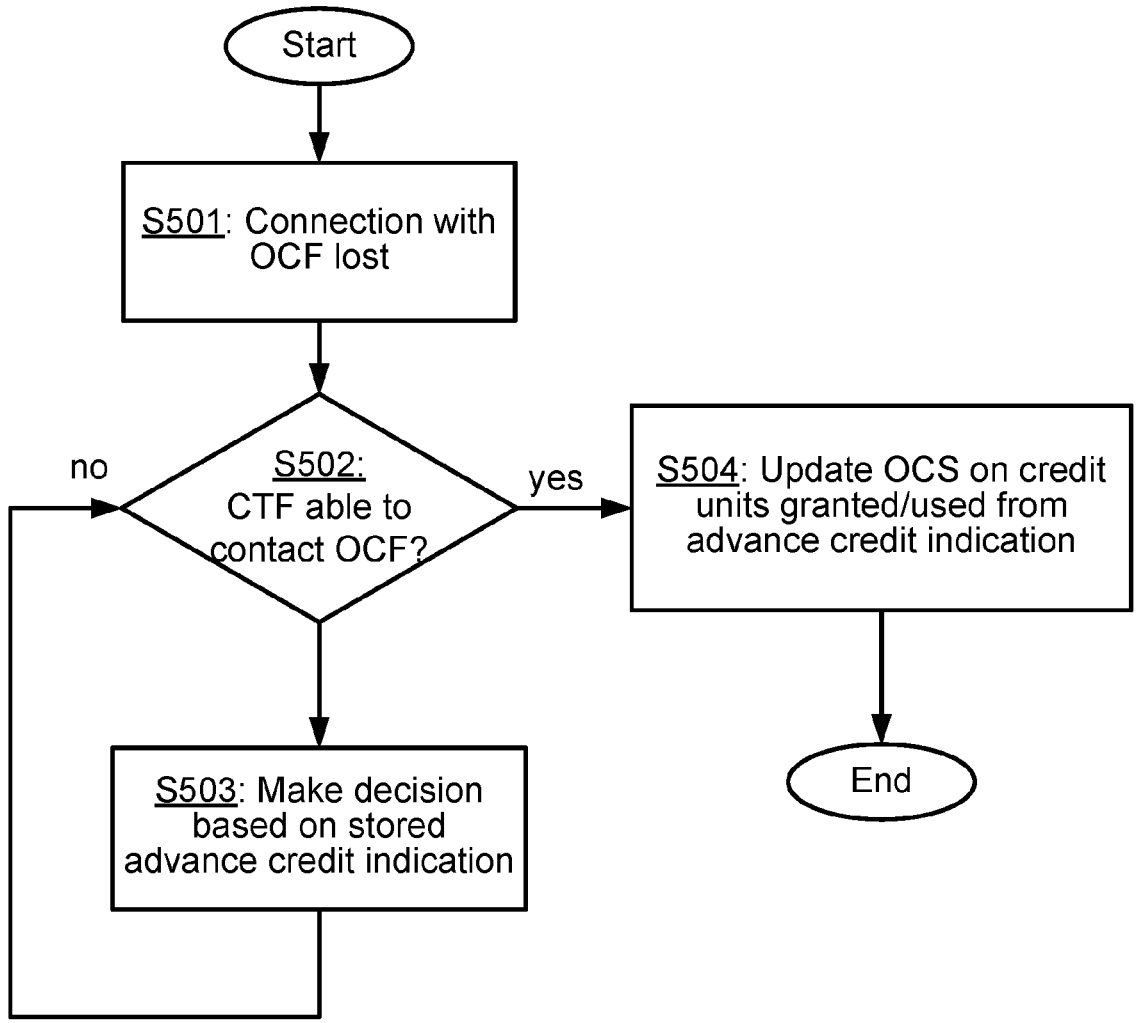

FIG. 6 is a flowchart illustrating an example of how the CTF node 200 might update the user account of the subscriber 110 in a scenario where the CTF node 200 grants network resources based on a stored advance credit indication.

S501: The CTF node 200 is unable to reach the OCF node 300. The connection with the OCF node 300 is thus deemed lost.

S502: The CTF node 200 checks if the connection with the OCF node 300 has been restored, and thus whether the CTF node 200 is able to contact the OCF node 300 or not. If yes, step S504 is entered, and if no, step S503 is entered.

S503: The CTF node 200 makes decisions as to whether to grant further network resources for maintaining the communication session for the subscriber 110 based on the stored advance credit indication, and updates the stored advance credit indication accordingly when determining to grant the further network resources.

S504: The CTF node 200 informs the OCF node 300 of any use of network resources based on the stored advance credit indication in order to update the OCF node 300 on credit units granted/used from the advance credit indication.

Figure 7:
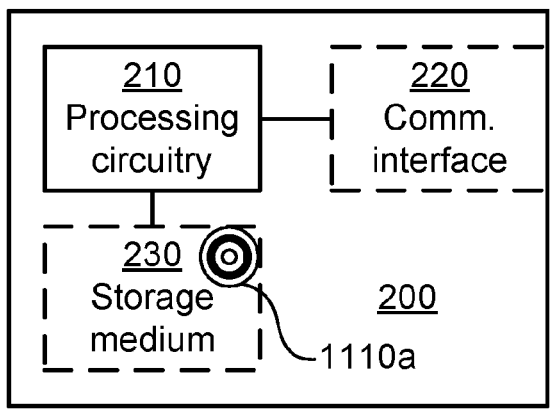
FIG. 7 is a schematic diagram showing functional units of a CTF node according to an embodiment.

FIG. 7 schematically illustrates, in terms of a number of functional units, the components of a CTF node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the CTF node 200 to perform a set of operations, or steps, as disclosed above. For example, the storage medium 230 may store the set of operations, and the processing circuitry 210 may be configured to retrieve the set of operations from the storage medium 230 to cause the CTF node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The CTF node 200 may further comprise a communications interface 220 for communications with other functions, entities, nodes, and devices of the network 100, such as the OCF node 300 and the gateway 120. As such the communications interface 220 may comprise one or more transmitters and receivers, comprising analogue and digital components.

The processing circuitry 210 controls the general operation of the CTF node 200 e.g. by sending data and control signals to the communications interface 220 and the storage medium 230, by receiving data and reports from the communications interface 220, and by retrieving data and instructions from the storage medium 230. Other components, as well as the related functionality, of the CTF node 200 are omitted in order not to obscure the concepts presented herein.

Figure 8:
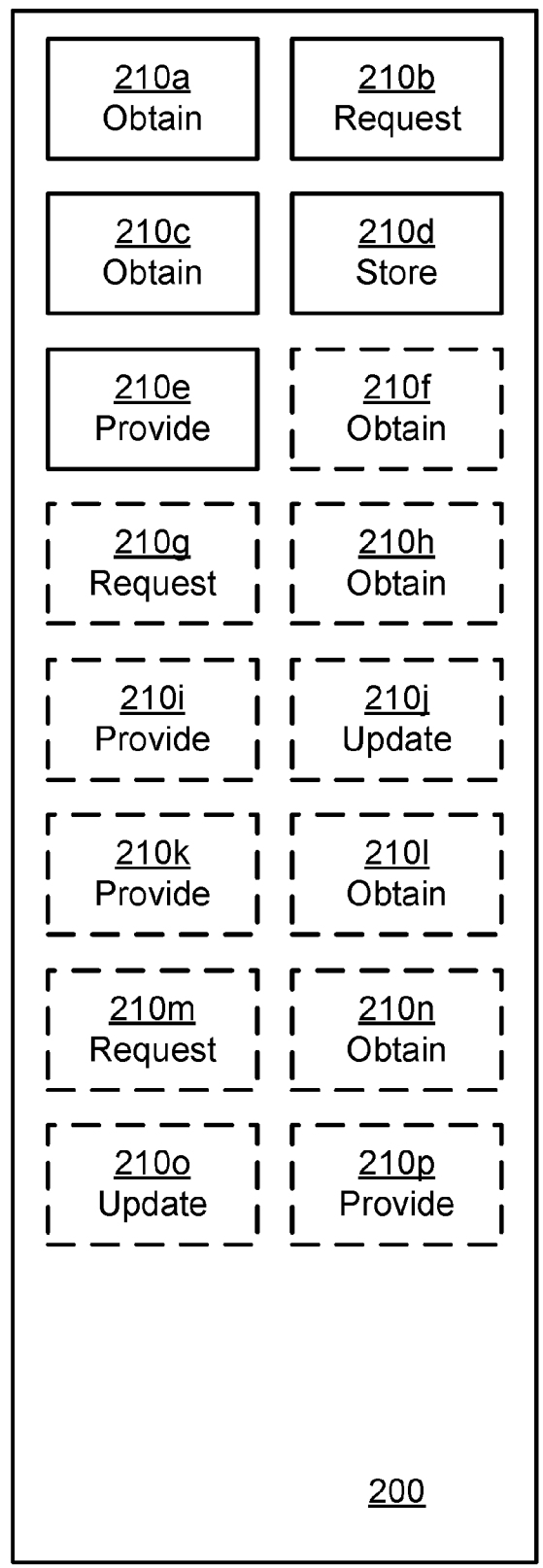
FIG. 8 is a schematic diagram showing functional modules of a CTF node according to an embodiment.

FIG. 8 schematically illustrates, in terms of a number of functional modules, the components of a CTF node 200 according to an embodiment. The CTF node 200 of FIG. 8 comprises a number of functional modules; an obtain module 210a configured to perform step S102, a request module 210b configured to perform step S104, an obtain module 210c configured to perform step S106, a store module 210d configured to perform step S108, and a provide module 210e configured to perform step S110. The CTF node 200 of FIG. 8 may further comprise a number of optional functional modules, such as any of an obtain module 210f configured to perform step S112, a request module 210g configured to perform step S114, an obtain module 210h configured to perform step S116, a provide module 210i configured to perform step S118, an update module 210j configured to perform step S120, a provide module 210k configured to perform step S122, an obtain module 210l configured to perform step S124, a request module 210m configured to perform step S126, an obtain module 210n configured to perform step S128, an update module 210o configured to perform step S130, a provide module 210p configured to perform step S132.

In general terms, each functional module 210a-210p may be implemented in hardware or in software. Preferably, one or more or all functional modules 210a-210p may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210p and to execute these instructions, thereby performing any steps of the CTF node 200 as disclosed herein.

Figure 9:
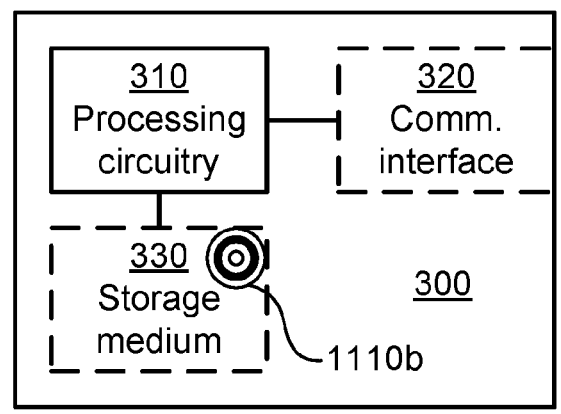
FIG. 9 is a schematic diagram showing functional units of an OCF node according to an embodiment.

FIG. 9 schematically illustrates, in terms of a number of functional units, the components of an OCF node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the OCF node 300 to perform a set of operations, or steps, as disclosed above. For example, the storage medium 330 may store the set of operations, and the processing circuitry 310 may be configured to retrieve the set of operations from the storage medium 330 to cause the OCF node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The OCF node 300 may further comprise a communications interface 320 for communications with other functions, entities, nodes, and devices of the network 100, such as the CTF node 200. As such the communications interface 320 may comprise one or more transmitters and receivers, comprising analogue and digital components.

The processing circuitry 310 controls the general operation of the OCF node 300 e.g. by sending data and control signals to the communications interface 320 and the storage medium 330, by receiving data and reports from the communications interface 320, and by retrieving data and instructions from the storage medium 330. Other components, as well as the related functionality, of the OCF node 300 are omitted in order not to obscure the concepts presented herein.

Figure 10:
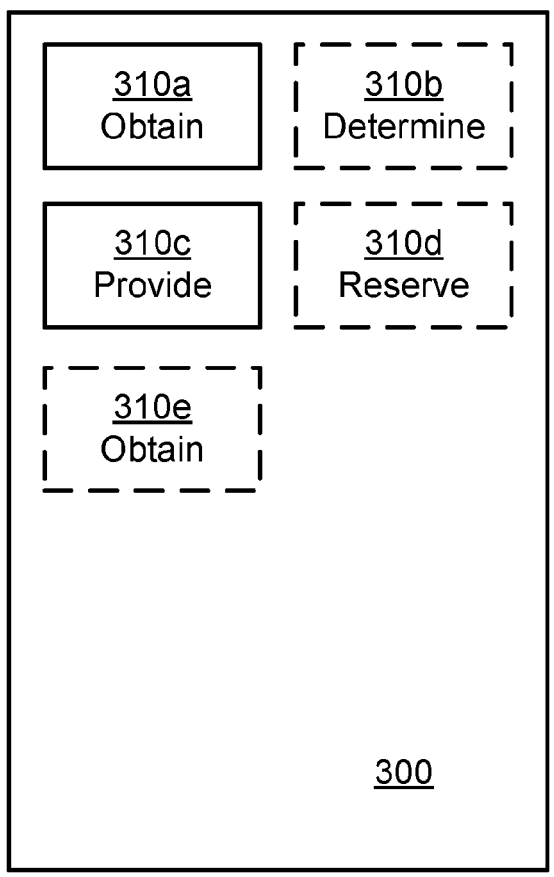
FIG. 10 is a schematic diagram showing functional modules of an OCF node according to an embodiment.

FIG. 10 schematically illustrates, in terms of a number of functional modules, the components of an OCF node 300 according to an embodiment. The OCF node 300 of FIG. 10 comprises a number of functional modules; an obtain module 310a configured to perform step S202, and a provide module 310c configured to perform step S206. The OCF node 300 of FIG. 10 may further comprise a number of optional functional modules, such as any of a determine module 310b configured to perform step S204, a reserve module 310d configured to perform step S208, and an obtain module 310e configured to perform step S210. In general terms, each functional module 310a-310e may be implemented in hardware or in software. Preferably, one or more or all functional modules 310a-310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310e and to execute these instructions, thereby performing any steps of the OCF node 300 as disclosed herein.

The CTF node 200 and/or OCF node 300 may be provided as a standalone device or as a part of at least one further device. For example, the CTF node 200 may be provided in a node of the core network 140 and the OCF node 300 may be provided in a node of the OCS 130. Alternatively, functionality of the CTF node 200 and/or OCF node 300 may be distributed between at least two devices, or nodes. These at least two nodes, or devices, may either be part of the same network part or may be spread between at least two such network parts. Thus, a first portion of the instructions performed by the CTF node 200 and/or OCF node 300 may be executed in a first device, and a second portion of the of the instructions performed by the CTF node 200 and/or OCF node 300 may be executed in a second device; the herein disclosed embodiments are not limited to any particular number of devices on which the instructions performed by the CTF node 200 and/or OCF node 300 may be executed. Hence, the methods according to the herein disclosed embodiments are suitable to be performed by a CTF node 200 and/or OCF node 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210p, 310a-310e of FIGS. 8 and 10 and the computer programs 1120a, 1120b of FIG. 11.

Figure 11:
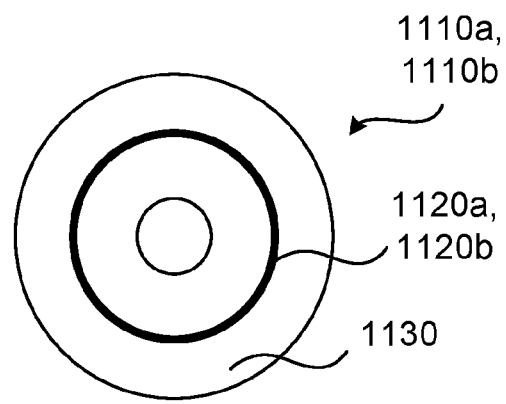
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the CTF node 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the OCF node 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for granting network resources for maintaining a communication session for a subscriber in a network, the method being performed by a Charging Trigger Function, CTF, node, the method comprising:

obtaining, from a gateway in the network, a request for network resources for maintaining the communication session for the subscriber;

requesting, from an Online Charging Function, OCF, node and in response thereto, credit units corresponding to the network resources;

obtaining a grant of the credit units as well as an advance credit indication of additional credit units for the communication session from the OCF node;

storing the advance credit indication for the communication session;

providing, to the gateway, a grant for the network resources for maintaining the communication session in accordance with the obtained grant, obtaining, from the gateway, a further request for further network resources for maintaining the communication session for the subscriber;

requesting, from the OCF node and in response thereto, further credit units corresponding to the further network resources;

obtaining an indication of unavailability of the OCF node; and providing, to the gateway, a further grant of the further network resources for maintaining the communication session in accordance with the stored advance credit indication.

2. The method according to claim 1, wherein the grant of the credit units is valid for one single request for credit units for the communication session, and wherein the advance credit indication pertains to grant of credit units for N≥1 additional such requests for the same communication session.

3. The method according to claim 1, wherein, upon expiration of the advance credit indication the CTF node either grants the gateway to maintain the communication session or causes the gateway to terminate the communication session.

4. The method according to claim 1, wherein the advance credit indication is used for granting further network resources for maintaining the communication session for the subscriber when the OCF node is unavailable.

5. The method according to claim 1, further comprising:
updating the stored advance credit indication for the communication session in accordance with the further network resource having been granted.

6. The method according to claim 1, further comprising, when the OCF node no longer is unavailable:
providing information about the further granted network resources to the OCF node.

7. The method according to claim 6, wherein the information is provided either upon requesting yet further credit units for the communication session, or separately from requesting yet further credit units for the communication session.

8. The method according to claim 1, wherein the advance credit indication is updated upon obtaining yet further advance credit indication of yet additional credit units for the communication session from the OCF node.

9. The method according to claim 1, further comprising:
obtaining, from the gateway, a yet further request for yet further network resources for maintaining the communication session for the subscriber;
requesting, from the OCF node and in response thereto, yet further credit units corresponding to the yet further network resources;

obtaining a further grant of the yet further credit units as well as a further advance credit indication of yet additional credit units for the communication session from the OCF node;

updating the stored advance credit indication for the communication session based on the further advance credit indication; and providing, to the gateway, a yet further grant of the yet further network resources for maintaining the communication session in accordance with the yet further grant.

10. A method for granting credit units for maintaining a communication session for a subscriber in a network, the method being performed by an Online Charging Function, OCF, node, the method comprising:

obtaining, from a Charging Trigger Function, CTF, node, a request for credit units corresponding to network resources for maintaining the communication session for the subscriber;

determining an amount of additional credit units to be indicated to the CTF node; and providing a grant of the credit units as well as an advance credit indication of the additional credit units for the communication session to the CTF node, wherein the grant of the credit units is valid for one single request for credit units for the communication session, and wherein the advance credit indication pertains to grant of credit units for N≥1 additional such requests, and wherein the advance credit indication is for the CTF node to grant further network resources for maintaining the communication session for the subscriber when the OCF node is unavailable.

11. The method according to claim 10, further comprising:

obtaining information about further granted network resources for the communication session from the CTF node, the further granted network resources having been granted in accordance with the advance credit indication.

12. The method according to claim 11, wherein the information is obtained either upon obtaining a request for yet further credit units for the communication session from the CTF node, or separately from obtaining a request for yet further credit units for the communication session from the CTF node.

13. An Online Charging Function, OCF, node for granting credit units for maintaining a communication session for a subscriber in a network, the OCF node comprising processing circuitry, the processing circuitry being configured to cause the OCF node to:

obtain, from a Charging Trigger Function, CTF, node, a request for credit units corresponding to network resources for maintaining the communication session for the subscriber;

determining an amount of additional credit units to be indicated to the CTF node; and provide a grant of the credit units as well as an advance credit indication of the additional credit units for the communication session to the CTF node, wherein the grant of the credit units is valid for one single request for credit units for the communication session, and wherein the advance credit indication pertains to grant of credit units for N≥1 additional such requests, and wherein the advance credit indication is for the CTF node to grant further network resources for maintaining the communication session for the subscriber when the OCF node is unavailable.

\* \* \* \* \*